United States Patent
Evans et al.

(10) Patent No.: US 10,675,716 B2
(45) Date of Patent: Jun. 9, 2020

(54) VANE ARRANGEMENT FOR A GAS TURBINE ENGINE

(71) Applicant: ROLLS-ROYCE plc, London (GB)

(72) Inventors: Dale E. Evans, Derby (GB); Steven A. Radomski, Nottingham (GB); Clive Grafton-Reed, Leicester (GB)

(73) Assignee: ROLLS-ROYCE plc, London (GB)

( * ) Notice: Subject to any disclaimer, the term of this patent is extended or adjusted under 35 U.S.C. 154(b) by 47 days.

(21) Appl. No.: 15/969,178

(22) Filed: May 2, 2018

(65) Prior Publication Data
US 2018/0318966 A1    Nov. 8, 2018

(30) Foreign Application Priority Data

May 4, 2017   (GB) .................................. 1707103.6

(51) Int. Cl.
 B23K 31/02    (2006.01)
 F01D 5/18    (2006.01)
 (Continued)

(52) U.S. Cl.
 CPC .............. *B23K 31/02* (2013.01); *B23P 15/04* (2013.01); *F01D 5/18* (2013.01); *F01D 9/042* (2013.01);
 (Continued)

(58) Field of Classification Search
 CPC ... B23K 31/02; B23K 2101/001; B23P 15/04; B23P 15/006; B23P 6/005; F01D 5/005;
 (Continued)

(56) References Cited

U.S. PATENT DOCUMENTS 3,166,295 A    1/1965  Szewalski et al.
4,883,216 A *  11/1989  Patsfall .................. B23K 20/00
                                       228/119
(Continued)

FOREIGN PATENT DOCUMENTS

CN    204209295    3/2015
EP     0841470    5/1998
(Continued)

OTHER PUBLICATIONS

Great Britain Search Report dated Nov. 3, 2017, issued in GB Patent Application No. 1707103.6.
(Continued)

*Primary Examiner* — Christopher J Besler
*Assistant Examiner* — Christine Bersabal
(74) *Attorney, Agent, or Firm* — Oliff PLC (57) ABSTRACT

A method of manufacturing a vane arrangement for a gas turbine engine comprises providing an aerofoil having a hollow cavity with an open end and providing a support member having a stub with a through hole extending therethrough. The method comprises welding the aerofoil to the stub such that the open end of the hollow cavity of the aerofoil is aligned with the through hole of the stub so as to define a hollow region extending through the support member and stub to the cavity of the aerofoil. During welding a tool is positioned within the through hole and cavity and is aligned with an interface between the stub and aerofoil, the tool being configured to prevent weld splatter onto a surface of the cavity or through hole.

20 Claims, 4 Drawing Sheets

(51) Int. Cl.
*F01D 9/04* (2006.01)
*B23P 15/04* (2006.01)
*F01D 25/28* (2006.01)
*B23K 101/00* (2006.01)

(52) U.S. Cl.
CPC ........ *F01D 9/044* (2013.01); *B23K 2101/001* (2018.08); *F01D 25/285* (2013.01); *F05D 2230/232* (2013.01); *F05D 2230/236* (2013.01); *F05D 2240/11* (2013.01); *F05D 2240/12* (2013.01)

(58) Field of Classification Search
CPC .......... F01D 5/18; F01D 5/3061; F01D 9/042; F01D 9/044; F01D 25/285; F05D 2230/232; F05D 2230/233; F05D 2230/234; F05D 2230/235; F05D 2230/236; F05D 2230/237; F05D 2230/238; F05D 2230/239; F05D 2230/80; F05D 2240/11; F05D 2240/12; F05D 2240/14
See application file for complete search history.

(56) References Cited

U.S. PATENT DOCUMENTS

| | | | |
|---|---|---|---|
| 4,944,444 A * | 7/1990 | Renner | F16P 1/06 219/59.1 |
| 6,394,750 B1 | 5/2002 | Hiskes | |
| 6,438,838 B1 | 8/2002 | Meier et al. | |
| 7,025,568 B2 | 4/2006 | Jones | |
| 7,544,040 B2 | 6/2009 | Marke et al. | |
| 2004/0060909 A1 | 4/2004 | D'Andrea et al. | |
| 2010/0054932 A1 | 3/2010 | Schiavo | |

FOREIGN PATENT DOCUMENTS

| | | |
|---|---|---|
| EP | 1319802 | 6/2003 |
| FR | 3029238 B1 | 1/2017 |
| GB | 807181 | 1/1959 |
| JP | S62118973 | 5/1987 |
| WO | 2014067868 | 5/2014 |

OTHER PUBLICATIONS

Great Britain Search Report dated Oct. 30, 2017, issued in Great Britain Patent Application No. 1707101.0.
U.S. Appl. No. 15/969,167, filed May 2, 2018 in the name of Evans, D.E. et al.
Apr. 16, 2020 Notice of Allowance issued in U.S. Appl. No. 15/969,167.

* cited by examiner

VANE ARRANGEMENT FOR A GAS TURBINE ENGINE

CROSS-REFERENCE TO RELATED APPLICATIONS

This specification is based upon and claims the benefit of priority from UK Patent Application Number 1707103.6 filed on 4 May 2017, the entire contents of which are incorporated herein by reference.

BACKGROUND

1. Field of the Disclosure

The present disclosure concerns a vane arrangement, for example a fan outlet guide vane arrangement, a gas turbine engine and/or a method of manufacturing a vane arrangement and/or a gas turbine engine.

2. Description of the Related Art

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core. Airflow from the fan is split with most of the air being directed through a bypass duct and the remainder of the air being directed to the engine core.

Fan outlet guide vanes (OGVs) are provided in the bypass duct, and extend between a radially inner ring (e.g. a casing of the core) and a radially outer casing (e.g. a casing proximal to a nacelle of an engine). Conventionally, OGVs are load bearing. If structures such as A-frames are provided, the OGVs are arranged to transmit radial and axial loads from the outer casing to the inner casing, and the A-frames transmit the torsional loads and some radial loads. The A-frames may be used with an annular stiffening ring. The A-frame is provided downstream of the OGVs and together the OGVs and A-frame can be arranged to address pitch and yaw loading on the nacelle. If no additional structure is provided for transmission of torsional loads, the OGV can be arranged for transmission of axial, radial and torsional loads.

SUMMARY

According to a first aspect there is provided a method of manufacturing a vane arrangement for a gas turbine engine. The method comprises providing an aerofoil having a hollow cavity with an open end and providing a support member having a stub with a through hole extending therethrough. The method comprises welding the aerofoil to the stub such that the open end of the hollow cavity of the aerofoil is aligned with the through hole of the stub so as to define a hollow region extending through the support member and stub to the cavity of the aerofoil. During welding a tool is positioned within the through hole and cavity and is aligned with an interface between the stub and aerofoil, the tool being configured to prevent weld splatter onto a surface of the cavity or through hole.

The vane arrangement may be a stator vane arrangement. Alternatively, the vane arrangement may be a rotary vane arrangement.

The cavity of the aerofoil may comprise a leading edge and a trailing edge. The width of the cavity may be a minimum at the leading edge and trailing edge and a maximum at a position therebetween. The through hole of the stub may comprise a leading edge and a trailing edge. The width of the through hole may be a minimum at the leading edge and trailing and a maximum at a position therebetween. The cavity may have the same cross sectional shape and/or dimensions as the through hole. In the present example, width is measured in a direction perpendicular to the spanwise direction and perpendicular to the chordal direction. The spanwise direction extends from one radial end of a vane to an opposite radial end of a vane. The chordal direction extends directly (and linearly) from the leading edge to the trailing edge of the vane.

The tool may comprise two opposing end members shaped to be received in a leading edge and trailing edge region of the cavity and through hole.

One end member may be positioned to be in a close fit with the leading edge and the other end member may be positioned to be in a close fit with the trailing edge.

The end members may comprise a radius section having a radius substantially equal to that of a leading and/or trailing edge of the cavity and/or the through hole The tool may comprise an elongate member extending between the end members.

The elongate member may comprise one or more arms that are moveable relative to each other so as to move the end members into contact with a surface of the cavity and through hole.

The tool may comprise a handle connected to the elongate member for manipulating the tool.

The end members may be removable or include a removable portion.

The end members or a portion of the end members may be removable so that they can be replaced (e.g. when damaged).

The end members may be made from or coated with a ceramic material.

The radius of a leading and/or trailing edge of the cavity and/or of the through hole may be greater than or equal to 3 mm. For example, the radius of a leading and/or trailing edge of the cavity and/or of the through hole is greater than or equal to 5 mm, or for example equal to or between 3 mm and 5 mm.

Walls of the aerofoil may be thicker in a region proximal to the open end of the cavity than a region distal to the open end of the cavity.

Walls of the stub may be thicker in a region proximal to a surface to be welded to the aerofoil than at a position distal to the surface to be welded to the aerofoil.

The walls of the aerofoil and/or stub may be tapered so as to increase the thickness of the walls towards a welded joint between the aerofoil and stub at least at the leading edge and/or trailing edge.

The walls of the aerofoil and/or stub may be tapered so as to increase the thickness of the walls around the entire perimeter of the aerofoil.

The method may comprise providing an aerofoil with an enclosed cavity and removing one end of the aerofoil, e.g. by machining, to expose the cavity and define the open end of the cavity.

The method may comprise forming the aerofoil with enclosed cavity using diffusion bonding and hot creep forming.

The support member may be a ring.

The stub of the support member may be welded to a radially inner end of the vane.

The method may comprise providing a support foot having a stub with a through hole, and welding a radially outer end of the aerofoil to the stub of the foot using the tool of the method of any one of the previous claims.

The support member may be a support foot.

The vane arrangement may be a fan outlet guide vane arrangement.

In an aspect there is provided a method of manufacturing a vane arrangement. The method comprises providing a plurality of aerofoils comprising a cavity with an open end, and providing a support member comprising a plurality of stubs with through holes. An aerofoil is connected to each stub using the method according to the previous aspect.

In an aspect there is provided a method of manufacturing a gas turbine engine comprising the method according to any one of the previous aspects.

In an aspect there is provided a vane arrangement comprising a support member and a vane integral with the support member. The vane comprises a cavity and the support member comprises a through hole. The through hole of the support member is aligned with the cavity of the vane so as to define hollow region that extends from an open end of a surface of the support member to the cavity of the vane.

The vane arrangement may comprise a plurality of vanes integral with the support member. For example, the vane arrangement may comprise a support member; and a plurality of vanes integral with the support member; wherein each vane comprises a cavity and the support member comprises a plurality of through holes, the through holes of the support member being aligned with the cavities of the vanes so as to define hollow regions that extend from an open end of a surface of the support member to the cavity of the vanes.

The vane may be defined by an aerofoil.

The support member may be a ring and the open end of the hollow region may be provided on a radially inner surface of the ring.

The vane may be welded to the support member.

The support member may comprise a plurality of stubs. One vane may be welded to each stub. The stubs may be hollow so as to form a portion of the hollow region.

The radius of the hollow region at the leading and trailing edge of the hollow region in a position proximal to the support member may be equal to or greater than 3 mm, for example, greater than or equal to 5 mm, or equal to or between 3 and 5 mm.

The radius of the cavity of the vane at the leading edge and trailing edge of the hollow region in a position proximal to the ring may be equal to or greater than 3 mm, for example, greater than or equal to 5 mm, or equal to or between 3 and 5 mm.

Walls of the vane may have increased thickness at a position proximal to the support member.

When the support member has a stub, walls of the stub may have increased thickness at a position proximal to the aerofoil.

The increase in thickness of the walls of the vanes or stub may be tapered.

The vane arrangement may be a fan outlet guide vane arrangement.

The vanes may be load bearing structural vanes.

The arrangement may be manufactured using the method of the previous aspect.

In an aspect there is provided a gas turbine engine comprising the arrangement according to the previous aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
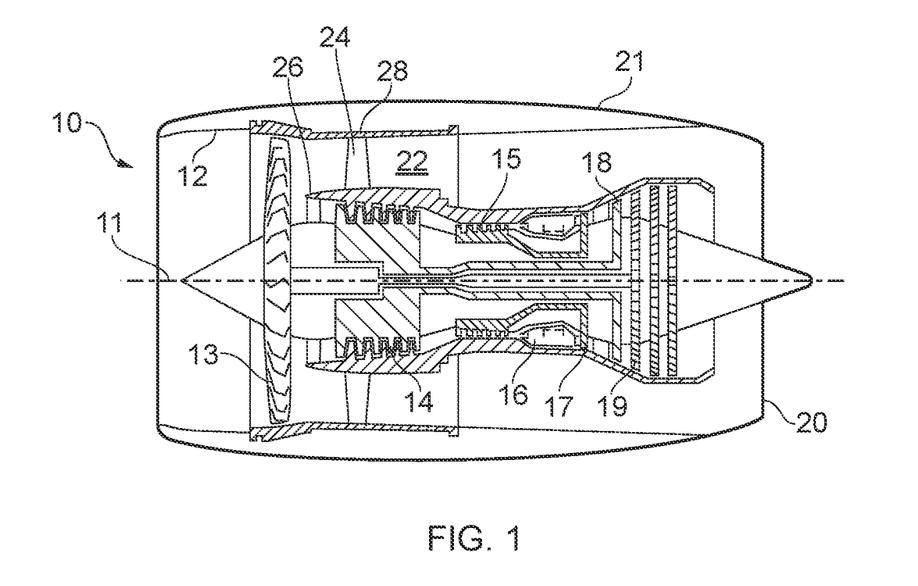
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Fan outlet guide vanes (OGVs) 24 are provided in the bypass duct 22. The OGVs guide airflow from the fan 13 through the bypass duct. The OGVs extend from an inner ring that connects to or forms part of the core casing/a splitter 24 that splits airflow from the fan between the bypass duct and the core. The OGVs are connected to an outer casing 28 of the bypass duct.

In the present example, the OGVs are arranged to transfer axial, radial and torsional loads. The OGVs are integrally formed with an inner ring and a hollow cavity is formed extending through the ring to a cavity of the OGV, such that the cavity of the OGV is open at a radially inner side of the ring. In this way, the aerofoil profile of the OGV can be greater (e.g. have a larger foot print) and/or the walls of the OGV can be thickened in a region proximal to the ring so as to cope with the transfer of torsional loads, without the need for an A-frame structure. Provision of a hollow region extending through the ring to the OGV means the aerofoil can be made larger in regions and/or the walls of the OGV can be thickened whilst having minimal weight and cost penalties. When the OGV is welded to the ring, the thickening of the walls of the OGV can improve the quality of the weld between the OGV and the ring.

A method of manufacturing an OGV of the present example will now be described.

Figure 2:
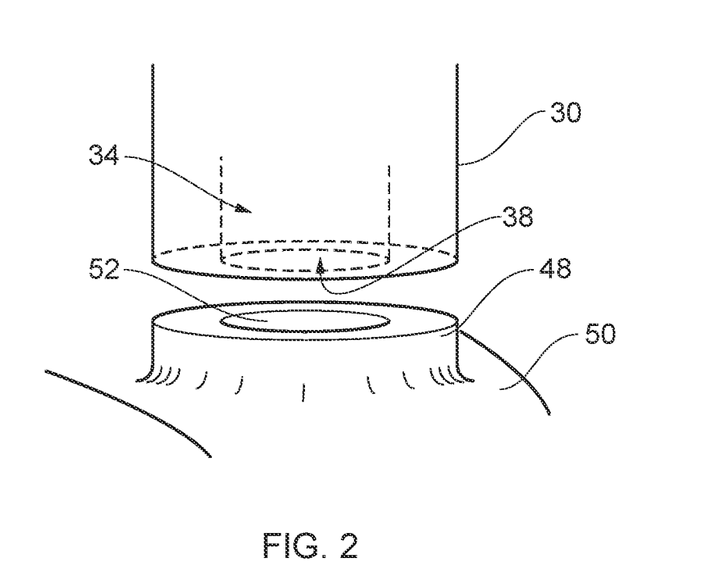
FIG. 2 is a perspective partial view of an aerofoil and a ring with a stub.

Referring to FIG. 2, an aerofoil 30 with a hollow cavity 34 that has at least one end 38 is provided. A ring 50 is also provided. The ring 50 includes a plurality of stubs 48. The stubs 48 include a through hole 52. The through hole extends the entire way through the stub and ring, such that the through hole extends from a radially inner surface of the ring to a radially outer surface of the stub. In the present example, the through hole in the stub and the cavity of the aerofoil are complimentary in shape. In the present example, the shape and dimensions of the cross section of the cavity and the through hole are the same. Further, when the aerofoil is positioned on the stub, the dimensions and shape of the cross section of the aerofoil and the stub are substantially equal at the interface between the two.

Figure 3:
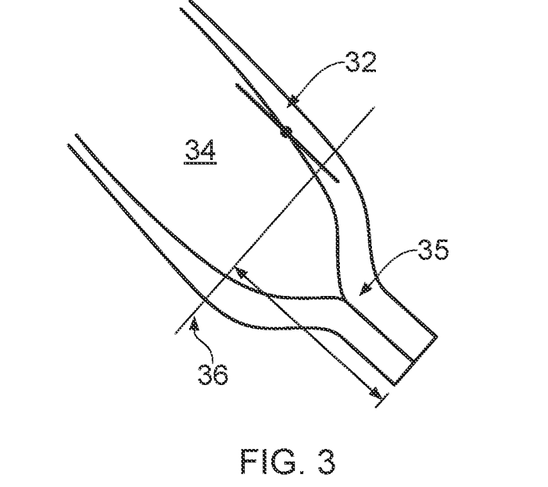
FIG. 3 is a transverse cross section of one end of an aerofoil with enclosed cavity.

Referring to FIG. 3, the aerofoil 30 is made using two panels 32 that are diffusion bonded together and then hot creep formed to define a cavity 34 and the walls of the aerofoil. The ends 35 of the aerofoil are diffusion bonded such that the cavity 34 is enclosed.

The panels 32 are tapered in thickness, such that the walls of the aerofoil have an increased thickness adjacent a position where the ends are diffusion bonded together. The tapering in thickness commences at a position spaced from the ends of the aerofoil, and more particularly spaced from a position 36 where the aerofoil will be subsequently trimmed to remove an end of the aerofoil. The spacing is such that the final trimmed aerofoil includes walls that have a thickness that increases in a taper towards a position of attachment with the ring. The tapering may be applied only in the regions of the leading and trailing edges, or may be applied across the entire cavity chord.

Figure 4:
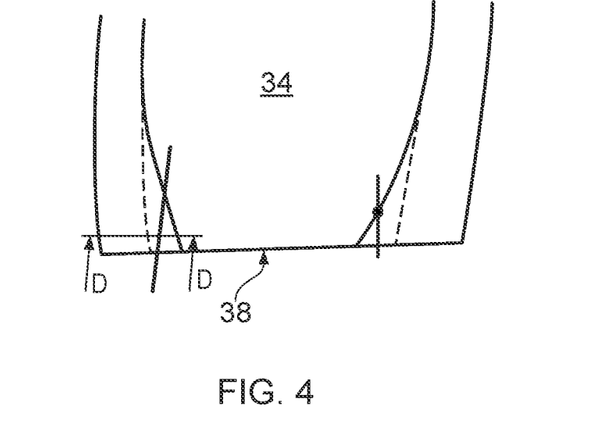
FIG. 4 is an axial cross section of one end of an aerofoil with a cavity open at one end.
Figure 5:
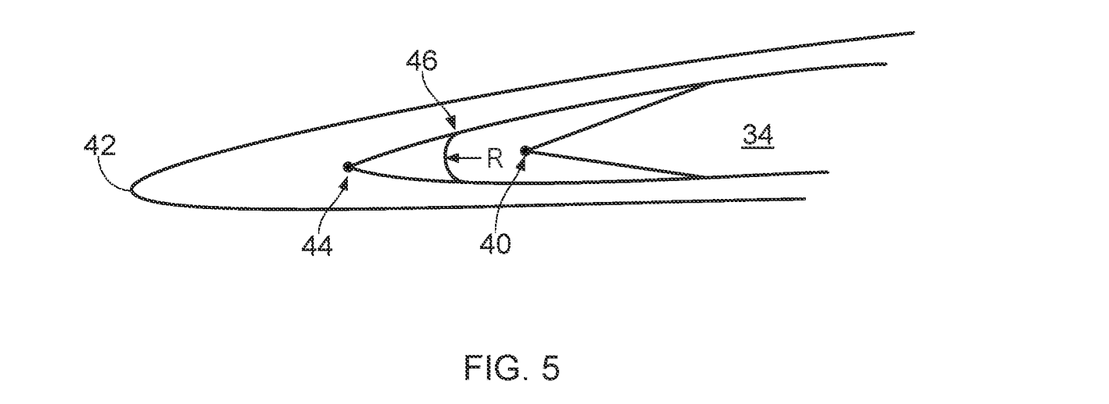
FIG. 5 is a cross section of a leading edge of an aerofoil taken at a section D-D of FIG. 4.

Once the aerofoil with enclosed cavity is formed, an end of the cavity is removed (at the line indicated at 36 in FIG. 3). The aerofoil is cut at a position sufficiently spaced from the end of the aerofoil that the cavity 34 is opened by the removal of the end. Further, the aerofoil is cut at a position before the walls of the aerofoil start to move closer together to form the closed end. Referring to FIG. 4, the walls of the aerofoil taper to have an increased thickness adjacent the open end 38 of the cavity 34. In this example, the increased thickness of the walls reduces the chord length of the cavity at a position proximal to the opening of the cavity compared to a position distal from the opening of the cavity. Referring to FIG. 5, it can be seen that the cavity 34 is shorter in chordal length compared to a cavity of a more conventional vane, with the leading edge 40 of the cavity 34 being spaced further from the leading edge 42 of the aerofoil, than a leading edge 44 of a cavity of a conventional vane, i.e. the leading edge portion of the aerofoil is thicker than a conventional vane.

Once the cavity 34 has been opened at a spanwise end of the aerofoil, the cavity is shaped (e.g. using a milling cutter) to increase the radius of a leading and trailing edge of the cavity 34. In the present example, the radius R is increased to approximately 3 to 5 mm. The radius of the leading edge and trailing edge of the cavity is increased in a region where the walls of the aerofoil taper to increase wall thickness; the added material provided by the thicker walls provides flexibility for selecting the desired radius. In the present example, the radius is increased in a portion of the tapered region proximal the cavity opening 38 (e.g. half of the tapered region has an increased radius). In this way, the cavity 34 of the aerofoil is still smaller in the region of the tapered portion of the walls, than a cavity of a conventional vane (the leading edge of the cavity at the increased radius portion is indicated at 46).

Referring to FIGS. 6 to 9, the aerofoil 30 with an open hollow cavity is welded to the stub 48. The aerofoil is placed on and in alignment with the stub 48, such that an interface is defined between the aerofoil and stub. The aerofoil and stub are then welded together to define a joint (i.e. a welded joint 68) between the aerofoil and the stub. During the welding process a tool 54 is positioned within the through hole and cavity and is aligned with the interface between the stub and aerofoil. The tool is configured to prevent weld spatter onto a surface of the cavity or through hole. Minimising weld spatter reduces the risk of formation of potential stress raising features or failure locations. As will be described later, the tool of the present example is also configured so that the tool can be adjusted for a close fit with the leading edge and trailing edge of the through hole and cavity, which can improve the quality of the weld. Once the aerofoil is welded to the stub, the tool is removed from the arrangement.

The tool 54 includes two end members 56. The end members are provided at opposite ends of the tool. The end members are shaped to be received in the region of the leading and trailing edge of the hollow region defined by the cavity and the through hole in a position adjacent the interface between the two. The end members include a radius portion that has the same radius as the leading edge and trailing edge of the hollow region, so in this example 3 to 5 mm. In the present example, the end members 56 are coated with a ceramic coating or provided as solid ceramic tips, so that it is possible to reuse the tool in subsequent welds.

Figure 6:
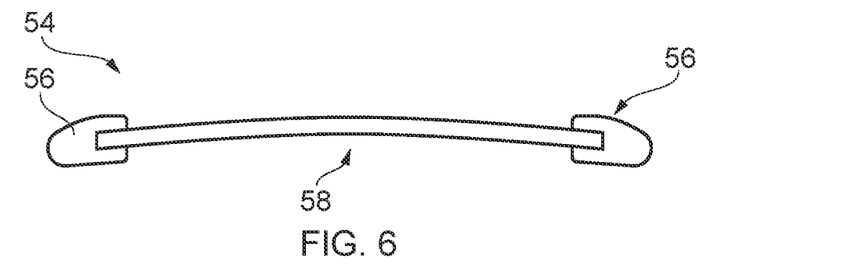
FIG. 6 is a plan view of a tool used during a process of welding an aerofoil to a stub.
Figure 7:
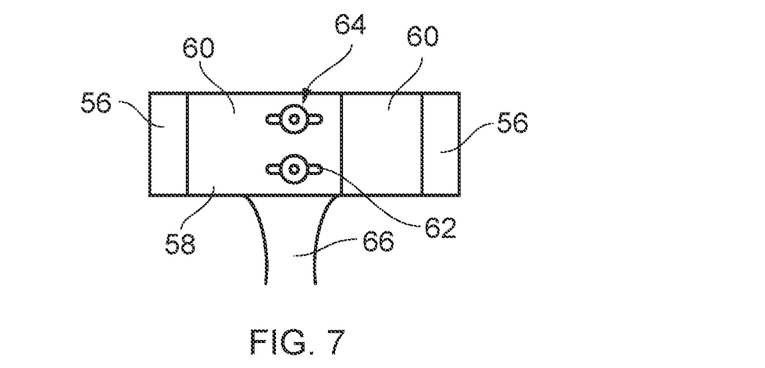
FIG. 7 is a side view of the tool of FIG. 6.
Figure 8:
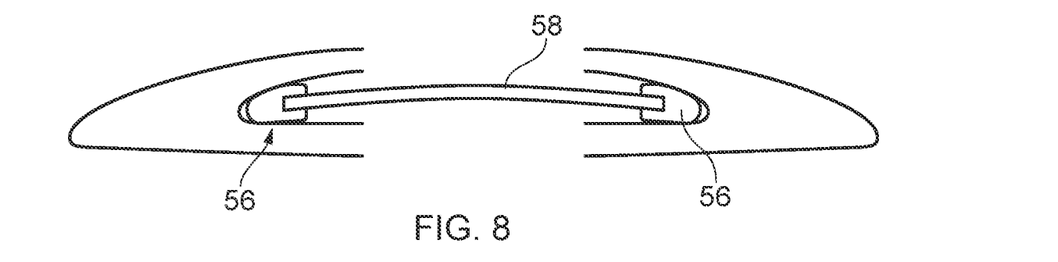
FIG. 8 is a plan section view of the tool in a hollow cavity defined by an aerofoil and a stub.
Figure 9:
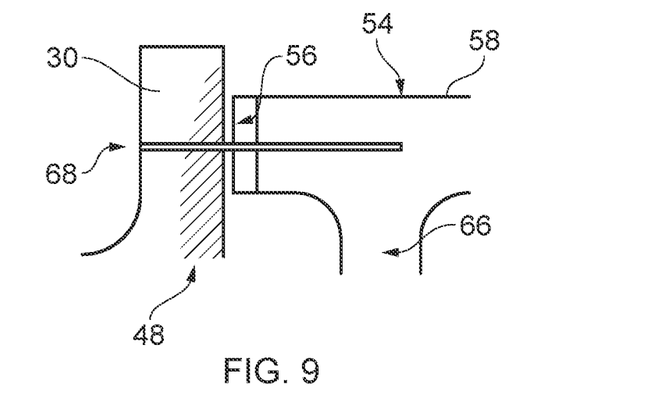
FIG. 9 is a partial side view of a tool within the hollow cavity defined by the aerofoil and stub.

The tool includes an elongate member 58 that extends between the two end members 56. The elongate member may be a plate. One end member is provided at each longitudinal end of the elongate member. The end members may be removably mounted to the elongate member, such that the end members can be replaced if/when they suffer damage or are substantially worn.

The elongate member is adjustable. In this example, the elongate member includes two arms 60 that are moveable relative to each other. The arms 60 are connected via a fastener 64 that is received in a slot 62. The position of the fastener within the slot determines the length of the elongate member. In alternative embodiments other methods of connecting and/or moving the arms may be provided, by way of example only a sprung mechanism or rack and pinion type mechanism may be used. The adjustable nature of the elongate member means that the length of the elongate member can be adjusted so as to achieve a close fit within the hollow cavity.

The described method of connection permits the aerofoil portion of the vane to be increased in wall thickness and/or outer aerofoil cross section in a region proximal to joints with inner and/or outer ring members or supports (e.g. foot members) for improved transmittal of torsional loads. The provision of a hollow region extending through the hub to the cavity of the aerofoil means that the weight penalty of having increased wall thickness can be reduced.

The use of the described tool during the welding process can eliminate or significantly reduce spatter on the walls of the hollow region. The radius applied to the leading edge and trailing edge of the cavity and through hole provides a controlled surface where the aerofoil and/or stub changes from solid to hollow. Further, when the tool is a close fit to the leading edge and trailing edge, the risk of voids forming in the weld may be further reduced.

Figure 10:
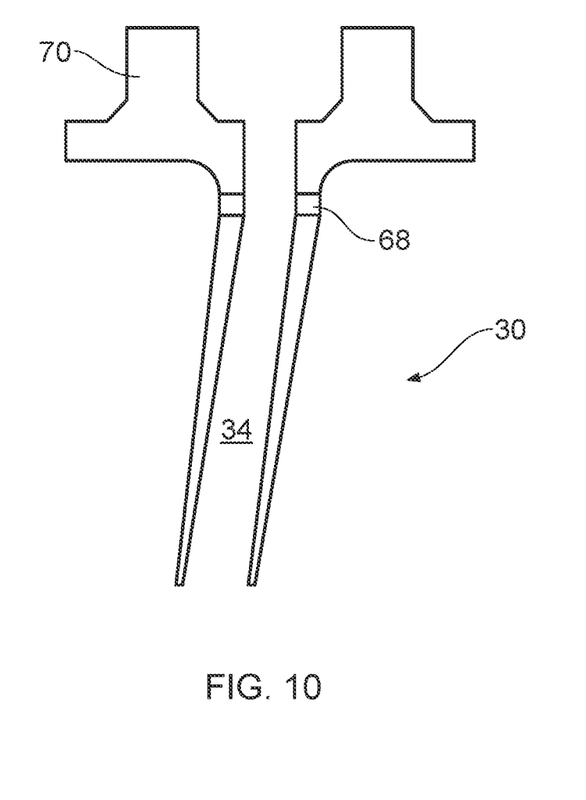
FIG. 10 is a cross section of an end of an aerofoil welded to a foot.

In the present example, a radially outer spanwise end of the OGV is connected to a foot 70 which can be bolted or otherwise connected to the outer casing of the engine, e.g. to a mounting ring. The foot may comprise a hollow stub. The aerofoil 30 may be connected to the foot in a similar manner to that previously described for connecting the inner spanwise end of the OGV to the stub of a ring. In this way, the aerofoil can be connected to the foot with a hollow region extending through the foot to the cavity of the aerofoil. In the present example, the hollow region extends through the foot, aerofoil and ring.

The above method has been described in relation to OGVs, but it may also be applied to other vane types.

In the present example, the stubs are provided on a ring that is defined by a single annulus member, but in alternative embodiments the ring may be defined by a plurality of arcuate members.

In the present example the aerofoil is manufactured using diffusion bonding and hot creep forming, but in alternative embodiments the aerofoil may be made using any other known manufacturing methods. In further alternative embodiments, an aerofoil and support member with a hollow cavity that extends through the support member to the aerofoil may be manufactured without the need to weld the aerofoil to the support member, for example using additive layer manufacturing techniques.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of manufacturing a vane arrangement for a gas turbine engine, the method comprising:
providing an aerofoil having a hollow cavity with an open end;
providing a support member having a stub with a through hole extending therethrough; and
welding the aerofoil to the stub such that the open end of the hollow cavity of the aerofoil is aligned with the through hole of the stub so as to define a hollow region extending through the support member and stub to the cavity of the aerofoil;
wherein during welding a tool is positioned within the through hole and cavity and is aligned with an interface between the stub and aerofoil, the tool being configured to prevent weld splatter onto a surface of the cavity or through hole.

2. The method according to claim 1, wherein the radius of a leading edge and/or trailing edge of the cavity and/or of the through hole is greater than or equal to 3 mm.

3. The method according to claim 1, wherein the tool comprises two opposing end members shaped to be received in a leading edge and trailing edge region of the cavity and through hole.

4. The method according to claim 3, wherein the end members are removable or include a removable portion.

5. The method according to claim 3, wherein the end members are made from or coated with a ceramic material.

6. The method according to claim 3, wherein one end member is positioned to be in a close fit with the leading edge and the other end member is positioned to be in a close fit with the trailing edge.

7. The method according to claim 6, wherein the end members comprise a radius section having a radius substantially equal to that of a leading and/or trailing edge of the cavity and/or the through hole.

8. The method according to claim 3, wherein the tool comprises an elongate member extending between the end members.

9. The method according to claim 8, wherein the elongate member comprises one or more arms that are moveable relative to each other so as to move the end members into contact with a surface of the cavity and through hole.

10. The method according to claim 8, wherein the tool comprises a handle connected to the elongate member for manipulating the tool.

11. The method according to claim 1, wherein walls of the aerofoil are thicker in a region proximal to the open end of the cavity than a region distal to the open end of the cavity.

12. The method according to claim 1, wherein walls of the stub are thicker in a region proximal to a surface to be welded to the aerofoil than at a position distal to the surface to be welded to the aerofoil.

13. The method according to claim 12, wherein the walls of the aerofoil and/or stub are tapered so as to increase the thickness of the walls towards a welded joint between the aerofoil and stub at least at the leading edge and/or trailing edge.

14. The method according to claim 1, comprising providing an aerofoil with an enclosed cavity and removing one end of the aerofoil to expose the cavity and define the open end of the cavity.

15. The method according to claim 14 comprising forming the aerofoil with enclosed cavity using diffusion bonding and hot creep forming.

16. The method according to claim 1, wherein the support member is a ring and, optionally, the stub of the ring is welded to a radially inner end of the vane.

17. The method according to claim 16, comprising providing a support foot having a stub with a through hole, and welding a radially outer end of the aerofoil to the stub of the foot using the tool of the method of any one of the previous claims.

18. The method according to claim 1, wherein the support member is a support foot and/or the vane arrangement is a fan outlet guide vane arrangement.

19. A method of manufacturing a vane arrangement, the method comprising providing a plurality of aerofoils comprising a cavity with an open end, and providing a support member comprising a plurality of stubs with through holes, and wherein an aerofoil is connected to each stub using the method according to claim 1.

20. A method of manufacturing a gas turbine engine comprising the method according to claim 1.

* * * * *